(12) United States Patent
Onufryk et al.

(10) Patent No.: US 8,656,071 B1
(45) Date of Patent: Feb. 18, 2014

(54) SYSTEM AND METHOD FOR ROUTING A DATA MESSAGE THROUGH A MESSAGE NETWORK

(75) Inventors: Peter Z. Onufryk, Flanders, NJ (US); Ganesh T. Seshan, Fremont, CA (US)

(73) Assignee: PMC-Sierra US, Inc., Sunnyvale, CA (US)

( * ) Notice: Subject to any disclaimer, the term of this patent is extended or adjusted under 35 U.S.C. 154(b) by 399 days.

(21) Appl. No.: 13/107,265

(22) Filed: May 13, 2011

Related U.S. Application Data

(60) Provisional application No. 61/374,242, filed on Aug. 16, 2010.

(51) Int. Cl.
*G06F 13/00* (2006.01)
*G06F 3/00* (2006.01)

(52) U.S. Cl.
USPC ............ 710/52; 710/2; 710/5; 710/8; 710/11; 710/15

(58) Field of Classification Search
None
See application file for complete search history.

(56) References Cited

U.S. PATENT DOCUMENTS

| | | | |
|---|---|---|---|
| 5,875,343 A | 2/1999 | Binford et al. | |
| 7,620,784 B2 | 11/2009 | Panabaker | |
| 7,708,195 B2 | 5/2010 | Yoshida et al. | |
| 8,244,946 B2 | 8/2012 | Gupta et al. | |
| 2008/0256280 A1 | 10/2008 | Ma | |
| 2008/0320214 A1 | 12/2008 | Ma et al. | |
| 2009/0077302 A1 | 3/2009 | Fukuda | |
| 2010/0185808 A1 | 7/2010 | Yu et al. | |
| 2010/0262979 A1 | 10/2010 | Borchers et al. | |
| 2011/0161678 A1 | 6/2011 | Niwa | |

OTHER PUBLICATIONS

NVM Express, revision 1.0; Intel Corporation; pp. 103-106 and 110-114; Jul. 12, 2011.
NVM Express, Revision 1.0; Intel Corporation; Mar. 1, 2011.

*Primary Examiner* — Scott Sun
(74) *Attorney, Agent, or Firm* — Kenneth Glass; Stanley J. Pawlik; Glass & Associates

(57) ABSTRACT

A communication system includes a destination node containing a message buffer pointer input queue and a message queue memory. Moreover, the message queue memory includes message buffers. A source node of the communication system generates data packets and a message buffer pointer packet. A message network of the communication system routes the data packets and the message buffer pointer packet to the destination node. The destination node writes a data message in a message buffer of the message queue memory based on the data packets and enqueues the message buffer pointer into the message buffer pointer input queue. Further, the destination node dequeues the message buffer pointer from the message buffer pointer input queue and accesses the data message in the message buffer based on a message buffer pointer.

19 Claims, 11 Drawing Sheets

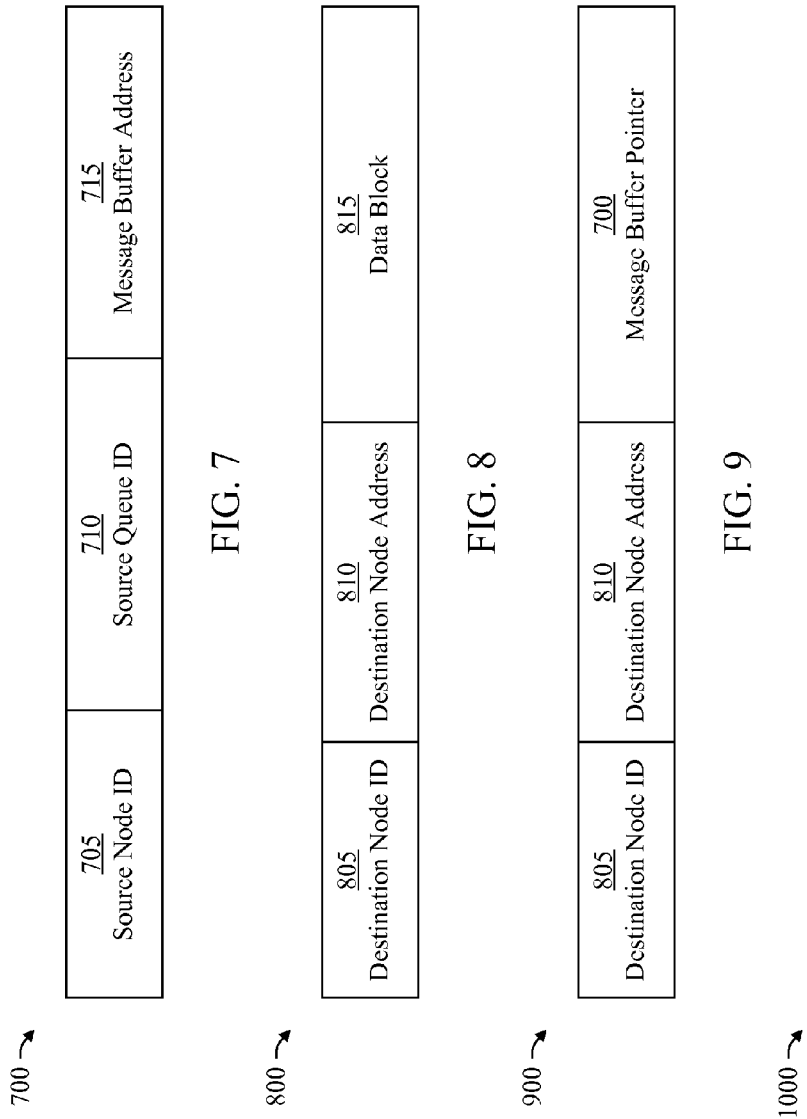

SYSTEM AND METHOD FOR ROUTING A DATA MESSAGE THROUGH A MESSAGE NETWORK

CROSS-REFERENCE TO RELATED APPLICATION

This application claims benefit of U.S. provisional patent application Ser. No. 61/374,242 filed Aug. 16, 2010 and entitled "Non Volatile Memory Host Controller Interface Device," which is incorporated herein by reference in its entirety.

BACKGROUND

A communication system is often employed to route a data message through a packet network by routing a number of data packets from a source node to a destination node. Each of the data packets includes a message identifier identifying the data message as well as a data payload including a portion of data message. The destination node identifies the data packets based on the message identifier in the data packets and constructs the data message by assembling the data payloads of the data packets. In some applications, the communication system is employed in an integrated circuit device. For example, the communication system may route data messages between source nodes and destination nodes in a system-on-a-chip (SOC).

Although such a communication system has been successfully employed to route a data message from a source node to a destination node in an integrated circuit device, the communication system may consume a considerable amount of area, power, and processing resources in the integrated circuit device. In light of the above, a need exists for an improved system and method of routing a data message through a packet network.

SUMMARY

In various embodiments, a communication system includes a source node and a destination node. The destination node contains a message buffer pointer input queue and a message queue memory including message buffers. The source node generates data packets and a message buffer pointer packet. A message network of the communication system routes the data packets and the message buffer pointer packet to the destination node. The destination node writes a data message in a message buffer of the message queue memory based on the data packets and enqueues the message buffer pointer into the message buffer pointer input queue. Further, the destination node dequeues the message buffer pointer from the message buffer pointer input queue and accesses the data message in the message buffer based on the message buffer pointer.

Because the communication system transmits the data message from the source node to the destination node by using a message buffer pointer, the communication network consumes less power and uses fewer resources than other communication systems that require a message identifier in each data packet of a data message. Moreover, the communication system allows for out-of-order processing of data messages unlike other communication systems that require sequential processing of data messages.

In some applications, the communication system is implemented in an integrated circuit device, such as a system-on-a-chip (SOC). In these applications, the communication system consumes less area, power, and processing resources in the integrated circuit in comparison to other communication systems.

A system, in accordance with one embodiment, includes a source node, a destination node, and a message network coupled to the source node and the destination node. The destination node includes a message buffer pointer input queue and further includes a message queue memory including message buffers. The source node is configured to generate a message buffer pointer packet identifying a message buffer in the message queue memory. Moreover, the message buffer includes storage locations. The source node is further configured to generate message data packets including a data message. Each of the message data packets includes a portion of the data message and an address of a storage location in the message buffer. The message network is configured to route the message data packets to the destination node and subsequently route the message buffer pointer packet to the destination node. The destination node is configured to write the data message into the message buffer based on the message data packets. Further, the destination node is configured to enqueue the message buffer pointer packet in the message buffer pointer input queue of the destination node to indicate the data message is stored in the message buffer identified by the message buffer pointer.

A system, in accordance with one embodiment, includes a source node, a destination node, and a message network coupled to the source node and the destination node. The destination node includes a message buffer pointer input queue and further includes a message queue memory including message buffers. The source node includes a message buffer pointer free queue configured to store message buffer pointers (i.e., free message buffer pointers). The source node is configured to dequeue a message buffer pointer identifying a message buffer of the message queue memory from the message buffer pointer free queue, generate a message buffer pointer packet including the message buffer pointer, and generate a sequence of message data packets having a sequential order and including a data message. Each of the message data packets in the sequence includes a portion of the data message and an address of a storage location in the message buffer. The message network is configured to route the message data packets to the destination node in the sequential order and subsequently route the message buffer pointer packet to the destination node. The destination node is configured to write the data message into the message buffer based on the message data packets. Further, the destination node is configured to enqueue the message buffer pointer packet in the message buffer pointer input queue of the destination node to indicate the data message is stored in the message buffer of the message buffer pointer packet.

A method, in accordance with one embodiment, includes generating a message buffer pointer packet including a message buffer pointer identifying a message buffer of a message queue memory in a destination node. The method also includes generating message data packets including a data message. Each of the message data packets includes a portion of the data message and an address of a storage location in the message buffer. Further, the method includes routing the message data packets from the source node to the destination node through a message network and writing the data message into the message buffer based on the message data packets. Additionally, the method includes routing the message buffer pointer packet from the source node to the destination node through the message network. The method further includes enqueueing the message buffer pointer packet in a message buffer pointer input queue of the destination node to indicate the data message is stored in the message buffer. In this way, the destination node posts the data message in the destination node.

Because the method routes the data message from the source node to the destination node by using a message buffer pointer, the method does not require a message identifier in each data packet of a data message as is required in other methods. Moreover, power consumption and processing requirements are reduced in a communication system using the method. Additionally, the method allows for out-of-order processing of data messages at the destination node of a communication system using the method.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 7 is a block diagram of a message buffer pointer, in accordance with an embodiment of the present invention.

FIG. 8 is a block diagram of a message data packet, in accordance with an embodiment of the present invention.

FIG. 9 is a block diagram of a message buffer pointer packet, in accordance with an embodiment of the present invention.

FIG. 10 is a block diagram of a message buffer pointer response packet, in accordance with an embodiment of the present invention.

DETAILED DESCRIPTION

In various embodiments, a source node of a communication system generates a message buffer pointer packet including a message buffer pointer identifying a message buffer of a destination node. Additionally, the source node generates message data packets including a data message. A message network of the communication system routes the data packets and the message buffer pointer packet to the destination node. The destination node stores the data message in the message buffer based on the data packets. Further, the destination node enqueues the message buffer pointer of the message buffer pointer packet into a message buffer pointer input queue of the destination node to indicate the data message is stored in the message buffer. In this way, the destination node posts the data message in the destination node.

Figure 1:
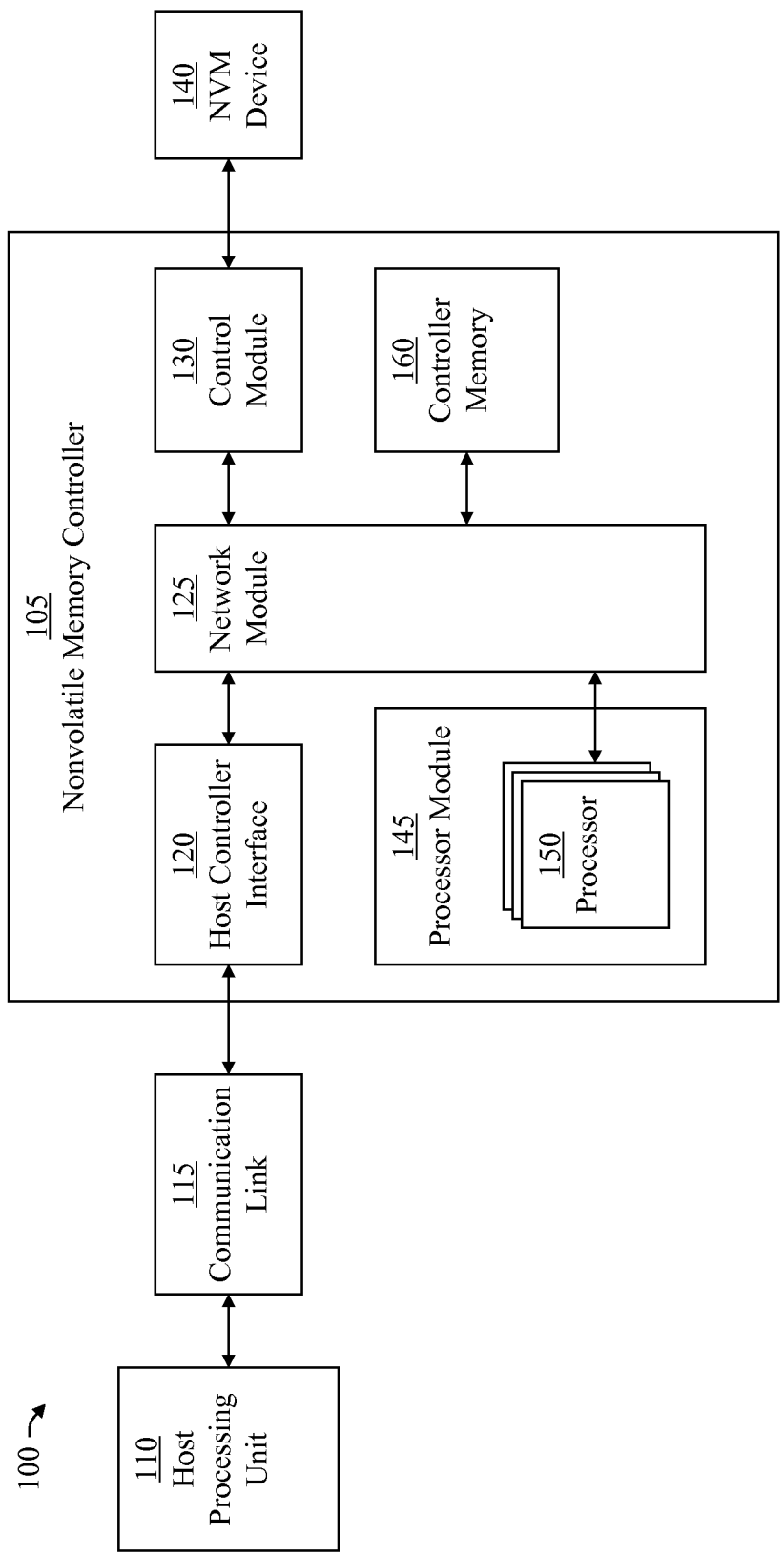
FIG. 1 is a block diagram of a computing system, in accordance with an embodiment of the present invention.

FIG. 1 illustrates a computing system 100, in accordance with an embodiment of the present invention. The computing system 100 includes a host processing unit 110, a communication link 115, a nonvolatile memory controller 105, and a nonvolatile memory device 140. The communication link 115 is coupled (e.g., connected) to the host processing unit 110 and the nonvolatile memory controller 105. Additionally, the nonvolatile memory controller 105 is coupled (e.g., connected) to the nonvolatile memory device 140. In various embodiments, the nonvolatile memory device 140 is a flash storage device and the nonvolatile memory controller 105 is a flash controller.

In various embodiments, the nonvolatile memory controller 105 includes a host controller interface 120, a network module 125, a control module 130, a processor module 145, and a controller memory 160. The network module 125 is coupled (e.g., connected) to the host controller interface 120, the control module 130, the processor module 145, and the controller memory 160. Additionally, the host controller interface 120 is coupled (e.g., connected) to the communication link 115, and the control module 130 is coupled (e.g., connected) to the nonvolatile memory device 140. Furthermore, the processor module 145 includes processors 150 coupled (e.g., connected) to the network module 125. In these embodiments, each of the host controller interface 120, the control module 130, the processors 150, and the controller memory 160 is a functional unit of the nonvolatile memory controller 105.

In various embodiments, each of the host controller interface 120, the control module 130, the processor module 145, and the controller memory 160 is source node or a destination node of the nonvolatile memory controller 105. In this way, each functional unit of the nonvolatile memory controller 105 may be a source node or a destination node. In some embodiments, one or more of the host controller interface 120, the control module 130, the processor module 145, and the controller memory 160 is both a source node and a destination node of the nonvolatile memory controller 105. In this way, a functional unit of the nonvolatile memory controller 105 may be both a source node and a destination node.

In various embodiments, the nonvolatile memory controller 105 is implemented in an integrated circuit of an integrated circuit device which may include an integrated circuit package containing the integrated circuit. In some embodiments, the nonvolatile memory controller 105 is implemented in more than one integrated circuit of an integrated circuit device which may include a multichip package containing the integrated circuits. In some embodiments, the nonvolatile memory controller 105 is implemented in a single semiconductor die.

Figure 2:
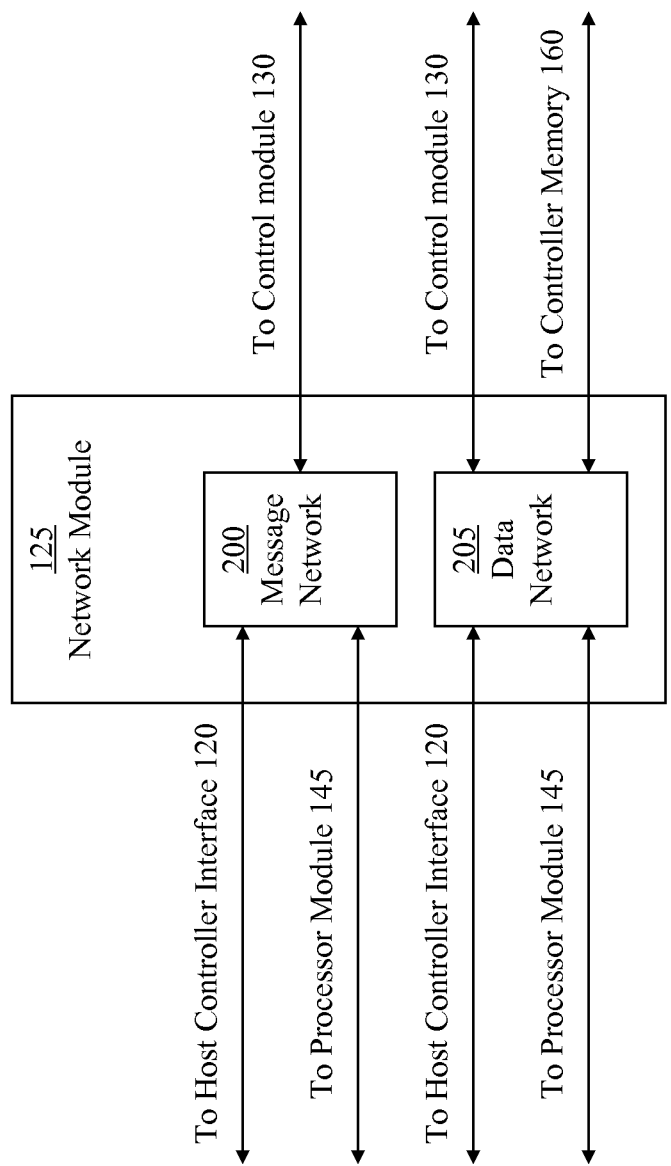
FIG. 2 is a block diagram of a network module, in accordance with an embodiment of the present invention.

FIG. 2 illustrates the network module 125, in accordance with an embodiment of the present invention. The network module 125 includes a message network 200 and a data network 205. Each of the message network 200 and the data network 205 is coupled (e.g., connected) to the host controller interface 120, the control module 130, the processor module 145. Additionally, the data network 205 is coupled (e.g., connected) to the controller memory 160.

The message network 200 routes message packets, such as request message packets and completion message packets, between functional units of the nonvolatile memory controller 105. The data network 205 routes data packets, such as data request packets and data completion packets, between functional units of the nonvolatile memory controller 105.

Figure 3:
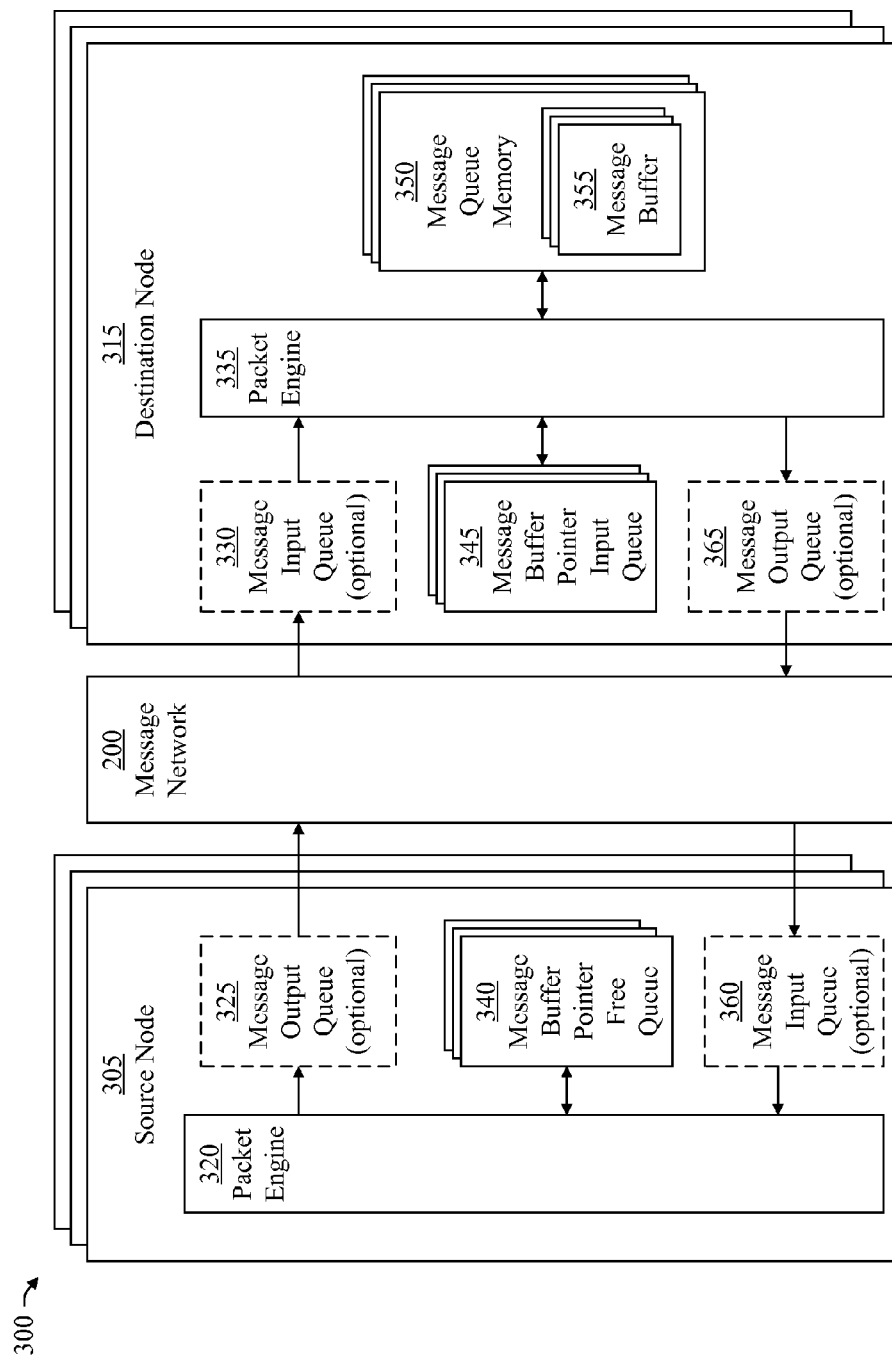
FIG. 3 is a block diagram of a communication system, in accordance with an embodiment of the present invention.

FIG. 3 illustrates a communication system 300, in accordance with an embodiment of the present invention. In various embodiments, the communication system 300 includes components of the nonvolatile memory controller 105 and is contained in the nonvolatile memory controller 105. The communication system 300 includes source nodes 305, the message network 200, and destination nodes 315. Each of the source nodes 305 and each of the destination nodes 315 is coupled (e.g., connected) to the message network 200. Moreover, each of the source nodes 305 and each of the destination nodes 315 is a functional unit of the nonvolatile memory controller 105. For example, the host controller interface 120 may be a source node 305 and a processor 150 may be a destination node 315. As another example, a processor 150 may be a source node 305 and the host controller interface 120 may be a destination node 315. In some embodiments, a functional unit of the nonvolatile memory controller 105 is both a source node 305 and a destination node 315. Although three source nodes 305 and three destination nodes 315 are illustrated in the embodiment of FIG. 3, the communication system 300 may include any number of source nodes 305 and any number of destination nodes 315 in other embodiments.

The source node 305 includes a packet engine 320, an optional message output queue 325, message buffer pointer free queues 340, and an optional message input queue 360. The message output queue 325 and the message input queue 360 are coupled (e.g., connected) to the packet engine 320 and the message network 200. Each of the message buffer pointer free queues 340 is coupled (e.g., connected) to the packet engine 320. Although three message buffer pointer free queues 340 are illustrated in embodiment of FIG. 3, the source node 305 may include any number of message buffer pointer free queues 340 in other embodiments.

The destination node 315 includes a packet engine 335, an optional message input queue 330, message buffer pointer input queues 345, an optional message output queue 365, and at least one message queue memory 350. The message input queue 330 and the message output queue 365 are coupled (e.g., connected) to the message network 200 and the packet engine 335. Additionally, the message buffer pointer input queues 345 and each message queue memory 350 is coupled (e.g., connected) to the packet engine 335. Moreover, each message queue memory 350 includes message buffers 355.

Although three message buffer pointer input queues 345 and three message queue memories 350 are illustrated in the embodiment of FIG. 3, the destination node 315 may include any number of message buffer pointer input queues 345 and any number of message queue memories 350 in other embodiments. Although the message queue memory 350 includes three message buffers 355 in the embodiment of FIG. 3, each of the message queue memories 350 in the communication system 300 may have any number of message buffers 355 in other embodiments.

In some embodiments, each of the message buffer pointer input queues 345 is associated with a corresponding message queue memory 350. In this way, the message buffer pointer input queues 345 have a one-to-one correspondence with the message queue memories 350. Moreover, the message buffers 355 of a message queue memory 350 are associated with the message buffer pointer input queue 345 corresponding to the message queue memory 350. In other embodiments, the destination node 315 includes a single message queue memory 350 associated with each message buffer pointer input queue 345 in the destination node 315. In some embodiments, a message buffer input queue 345 is associated with a corresponding message queue memory 350 (i.e., one-to-one correspondence) and other message buffer input queues 345 are associated with another message queue memory 350 (i.e., many-to-one correspondence).

In various embodiments, the message buffer pointer free queue 340 of a source node 305 stores message buffer pointers associated with the message buffer pointer free queue 340. Each of the message buffer pointers identifies a message buffer 355 in a message queue memory 350 of a destination node 315. In some embodiments, the source node 305 generates the message buffer pointers and enqueues the message buffer pointers into the message buffer pointer free queue 340, for example during initialization of the source node 305. In this way, the source node 305 allocates the message buffer pointers to the message buffer pointer free queue 340. For example, the packet engine 320 of the source node 305 may generate a message buffer pointer and enqueue the message buffer pointer to into message buffer pointer free queue 340 of the source node 305. In other embodiments, another entity of the communication system 300 may generate a message buffer pointer or enqueue a message buffer pointer into a message buffer pointer free queue 340.

In various embodiments, the packet engine 320 of the source node 305 associates a message buffer pointer free queue 340 of the source node 305 with a destination node 315. Furthermore, the packet engine 320 of the source node 305 associates the message buffer pointer free queue 340 with a message buffer pointer input queue 345 of the destination node 315. Moreover, each message buffer pointer in the message buffer pointer free queue 340 identifies a unique message buffer 355 in the message queue memory 350 associated with the message buffer pointer input queue 345 of the destination node 315.

In some cases, more than one source node 305 may associate a message buffer pointer free queue 340 of the source node 305 with the same destination node 315 and the same message buffer pointer input queue 345 of the destination node 315. In these cases, each of the message buffer pointers stored in the source nodes 305 that identify the message buffer pointer input queue 345 of the destination node 315 also identify a unique message buffer 355 in the message queue memory 350 associated with the message buffer pointer input queue 345. Moreover, each message buffer pointer stored in the message buffer pointer free queues 340 of the source nodes 305 in the communication system 300 identifies a unique message buffer 355 in the message queue memories 350 of the destination nodes 315 in the communication system 300.

In operation, the packet engine 320 of a source node 305 selects a destination node 315 for receiving a data message from the source node 305 and selects a message buffer pointer free queue 340 of the source node 305. The message buffer pointer free queue 340 selected by the packet engine 320 of the source node 305 is associated with the destination node 315 and a message buffer pointer input queue 345 of the destination node 315. The packet engine 320 of the source node 305 dequeues a message buffer pointer from the message buffer pointer free queue 340. In this way, the packet engine 320 allocates the message buffer pointer to the data message. Moreover, the message buffer pointer includes a message buffer address identifying a message buffer 355 in a message queue memory 350 of the destination node 315 associated with the message buffer pointer input queue 345.

The packet engine 320 generates a sequence of data packets containing the data message based on the message buffer pointer. Moreover, the data packets have a sequential order. Each of the data packets includes a portion of the data message (e.g., a data block), a destination node identifier identifying the destination node 315, and an address of a storage location in the message buffer 355 identified by the message buffer pointer (e.g., a destination node address). Additionally, the packet engine 320 generates a message buffer pointer packet including the destination node identifier, an address identifying the message buffer pointer input queue 345 of the destination node 315, and the message buffer pointer. In this way, the packet engine 320 generates the data packets and the message buffer pointer packet based on the message buffer pointer.

The source node 305 provides the data packets to the message network 200 in the sequential order and subsequently provides the message buffer pointer packet to the message network 200. In embodiments including the message output queue 325, the packet engine 320 of the source node 305 writes (e.g., enqueues) the data packets into the message output queue 325 and subsequently writes the message buffer pointer packet into the message output queue 325. In turn, the message output queue 325 provides the data packets to the message network 200 in the sequential order and subsequently provides the message buffer pointer packet to the message network 200.

The message network 200 routes the data packets from the source node 305 to the destination node 315 in the sequential order based on the destination node identifier in each of the data packets and subsequently routes the message buffer pointer packet from the source node 305 to the destination node 315 based on the destination node identifier in the message buffer pointer packet. In this way, the message network 200 routes packets (e.g., the message data packets and the message buffer pointer input packet) from the source node 305 to the destination node 315 in a same order in which the message network 200 receives the packets from the source node 305.

The destination node 315 writes (e.g., enqueues) the data packets and the message buffer pointer packet into the message input queue 330 of the destination node 315. Because the message network 200 routes the message data packets to the destination node 315 before routing the message buffer pointer packet to the destination node 315, the message buffer pointer packet follows the message data packets in the message input queue 330. The packet engine 335 of the destination node 315 reads (e.g., dequeues) each of the message data packets from the message input queue 330 and writes the portion of the data message in the message data packet into the message buffer 355 at the address of the storage location identified in the message data packet (e.g., a destination node address). In this way, the packet engine 335 of the destination node 315 writes the data message of the message data packets into the message buffer 355.

Furthermore, the packet engine 335 of the destination node 315 reads (e.g., dequeues) the message buffer pointer packet from the message input queue 330. Moreover, the packet engine 335 of the destination node 315 enqueues the message buffer pointer of the message buffer pointer packet into the message buffer pointer input queue 345 associated with the message buffer pointer to indicate that the data message is stored in the message buffer 355 of the message queue memory 350. In this way, the packet engine 335 of the destination node 315 posts the data message to the message buffer pointer input queue 345 subsequent to writing the data message into the message buffer 355 of the message queue memory 350.

In further embodiments, the packet engine 335 of the destination node 315 dequeues the message buffer pointer from the message buffer pointer input queue 345. For example, the packet engine 335 of the destination node 315 may dequeue the message buffer pointer from the message buffer pointer input queue 345 when the packet engine 335 is ready to process the data message. The packet engine 335 of the destination node 315 accesses the data message in the message buffer 355 based on the message buffer pointer dequeued from the message buffer pointer input queue 345 and processes the data message.

Because the packet engine 335 dequeues the message buffer pointer packet from the message input queue 330 and enqueues the message buffer pointer into the message buffer pointer input queue 345 before processing the data message, the packet engine 335 avoids congestion and head-of-line blocking that may otherwise occur in the message input queue 330 before the packet engine 335 processes the data message. Furthermore, the message data packets including the data message need not include a message identifier (e.g., a transaction identifier) identifying the message.

Because the packet engine 335 processes the data message in a message buffer 355 (i.e., in-place processing) based on the message buffer pointer allocated to the data message, the destination node 315 need not copy the data message to another storage location for processing. In this way, storage and processing resources are reduced in comparison to other communication systems that require a data message to be copied to another storage location for processing. Further, because each of the data messages is associated with an allocated message buffer pointer, the destination node 315 may process data messages in a different order than the order in which the destination node 315 received the data messages.

In further embodiments, the packet engine 335 of the destination node 315 generates a message buffer pointer response packet based on the message buffer pointer packet received at the destination node 315. The message buffer pointer response packet includes the source node identifier, the source queue identifier, and the message buffer address of the message buffer pointer in the message buffer pointer packet received by the destination node 315. For example, the packet engine 335 of the destination node 315 may generate the message buffer pointer response packet based on the message buffer pointer dequeued from the message buffer pointer input queue 345 of the destination node 315. In this way, the packet engine 335 of the destination node 315 frees the message buffer pointer so that the message buffer pointer may be used to send another data message from the source node 305 to the destination node 315.

The destination node 315 provides the message buffer pointer response packet to the message network 200. In embodiments in which the destination node 315 includes the message output queue 365, the packet engine 335 writes (e.g., enqueue) the message buffer pointer response packet into the message output queue 365. In turn, the message output queue 365 provides the message buffer pointer response packet to the message network 200. The message network 200 routes the message buffer pointer response packet to the source node 305 based on the source node identifier in the message buffer pointer response packet. In embodiments including the message input queue 360, the source node 305 writes (e.g., enqueues) the message buffer pointer response packet into the message input queue 360 of the source node 305. Moreover, the packet engine 320 of the source node 305 reads (e.g., dequeues) the message buffer pointer response packet from the message input queue 360.

The packet engine 320 of the source node 305 identifies the message buffer pointer free queue 340 that previously stored the message buffer pointer of the message buffer pointer response packet, based on the source queue identifier of the message buffer pointer response packet. Additionally, the packet engine 320 enqueues the message buffer pointer of the message buffer pointer response packet into the message buffer pointer free queue 340 identified by the source queue identifier of the message buffer pointer response packet. In this way, the packet engine 320 allocates the message buffer pointer to the message buffer pointer free queue 340. The source node 305 may then allocate the message buffer pointer to a new data message and send the new data message to the destination node 315.

In some embodiments, the communication system 300 holds one or more message buffers 355 (e.g., a pool of message buffers) in reserve and selectively frees message buffer pointers to those message buffers 355. In this way, the communication system 300 performs an additional level of queuing for free message buffer pointers. For example, a processor 150 may selectively free message buffer pointers to the message buffers 355 in the pool of message buffers.

In some embodiments, the communication system 300 frees a message buffer pointer associated with a message buffer 355 contained in the pool of message buffers to avoid or reduce processing latency of a data message. For example, the communication system 300 may free a message buffer pointer in response to receiving a message buffer pointer of a data message to be processed by the destination node 315. In this way, hardware of the communication system 300 (e.g., packet engines 320 and packet engines 335) manages message network latency by generating message buffer pointer response packets and firmware of the communication system 300 (e.g., computing instructions processed by a processor 150) manages processing latency of a data message.

In various embodiments, one or more of the message output queue 325, the message input queue 330, the message input queue 360, and the message output queue 365 is a first-in-first-out (FIFO) queue. In some embodiments, one or more of the message output queue 325, the message input queue 330, the message input queue 360, and the message output queue 365 is a data buffer capable of storing a single packet (e.g., a message data packet or a message buffer pointer packet).

In various embodiments, the communication system 300 is implemented in an integrated circuit of an integrated circuit device which may include an integrated circuit package containing the integrated circuit. In some embodiments, the communication system 300 is implemented in more than one integrated circuit of an integrated circuit device which may include a multichip package containing the integrated circuits. In some embodiments, the communication system 300 is implemented in a single semiconductor die.

Figure 4:
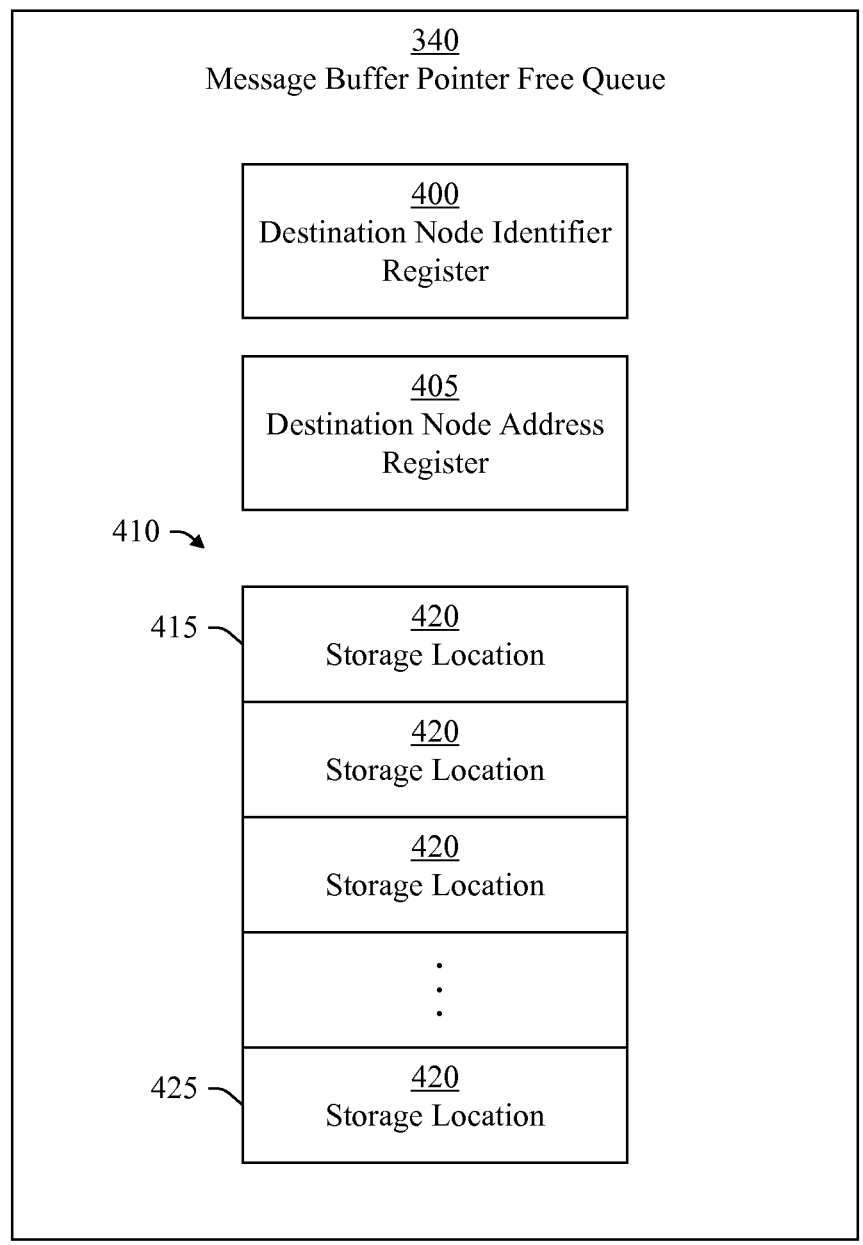
FIG. 4 is a block diagram of a message buffer pointer free queue, in accordance with an embodiment of the present invention.

FIG. 4 illustrates the message buffer pointer free queue 340, in accordance with an embodiment of the present invention. The message buffer pointer free queue 340 includes a destination node identifier register 400, a destination node address register 405, and a message buffer address queue 410. The message buffer address queue 410 includes storage locations 420. Each of the storage locations 420 of the message buffer address queue 410 is capable of storing a message buffer address of a message buffer 355 in a message queue memory 350. Moreover, the message buffer address queue 410 includes a head 415 and a tail 425.

In various embodiments, a source node 305 associates a message buffer pointer free queue 340 of the source node 305 with a destination node 315 by writing a destination node identifier identifying the destination node 315 into the destination node identifier register 400 of the message buffer pointer free queue 340. For example, the packet engine 320 of the source node 305 or another entity in the communication system 300 may write the destination node identifier into the destination node identifier register 400. Additionally, the source node 305 associates the message buffer pointer free queue 340 of the source node 305 with a message buffer pointer input queue 345 of the destination node 315 by writing a destination node address identifying the message buffer pointer input queue 345 into the destination node address register 405 of the message buffer pointer free queue 340. For example, the packet engine 320 of the source node 305 may write the destination node address into the destination node address register 405.

In addition to associating the message buffer pointer free queue 340 with the destination node 315, the source node 305 enqueues a message buffer pointer identifying a message buffer 355 into the message buffer pointer free queue 340 by enqueueing a message buffer address identifying the message buffer 355 at the tail 425 of the message buffer address queue 410 in the message buffer pointer free queue 340. For example, the packet engine 320 of the source node 305 or another entity in the communication system 300 may enqueue the message buffer address in the message buffer pointer free queue 340. The source node 305 dequeues a message buffer pointer identifying a message buffer 355 from the message buffer pointer free queue 340 by dequeueing a message buffer address identifying the message buffer 355 at the head 415 of the message buffer address queue 410.

Figure 5:
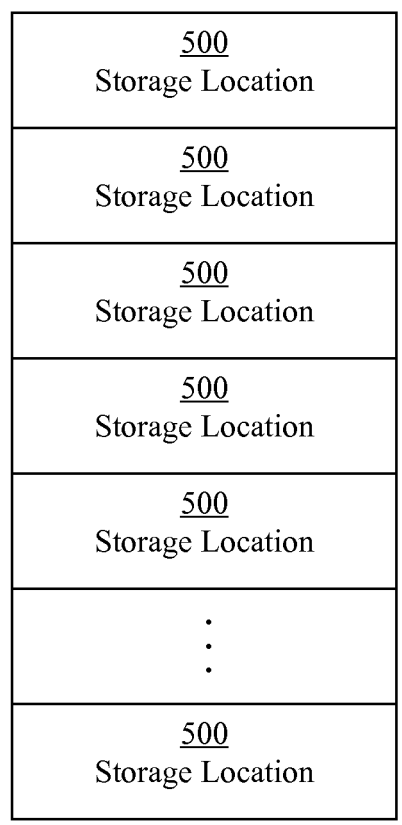
FIG. 5 is a block diagram of a message buffer, in accordance with an embodiment of the present invention.

FIG. 5 illustrates the message buffer 355, in accordance with an embodiment of the present invention. The message buffer 355 includes storage locations 500. Each of the storage locations 500 of the message buffer 355 is capable of storing a portion of a data message contained in a message data packet (e.g., a data block of the data message). In various embodiments, the message buffer 355 has a fixed data size and the addresses of the storage locations 500 of the message buffer 355 are in an address range. Furthermore, a message buffer pointer identifies the message buffer 355 by identifying the storage location 500 at one end of the address range (e.g., a lowest address or a highest address of the address range).

Figure 6:
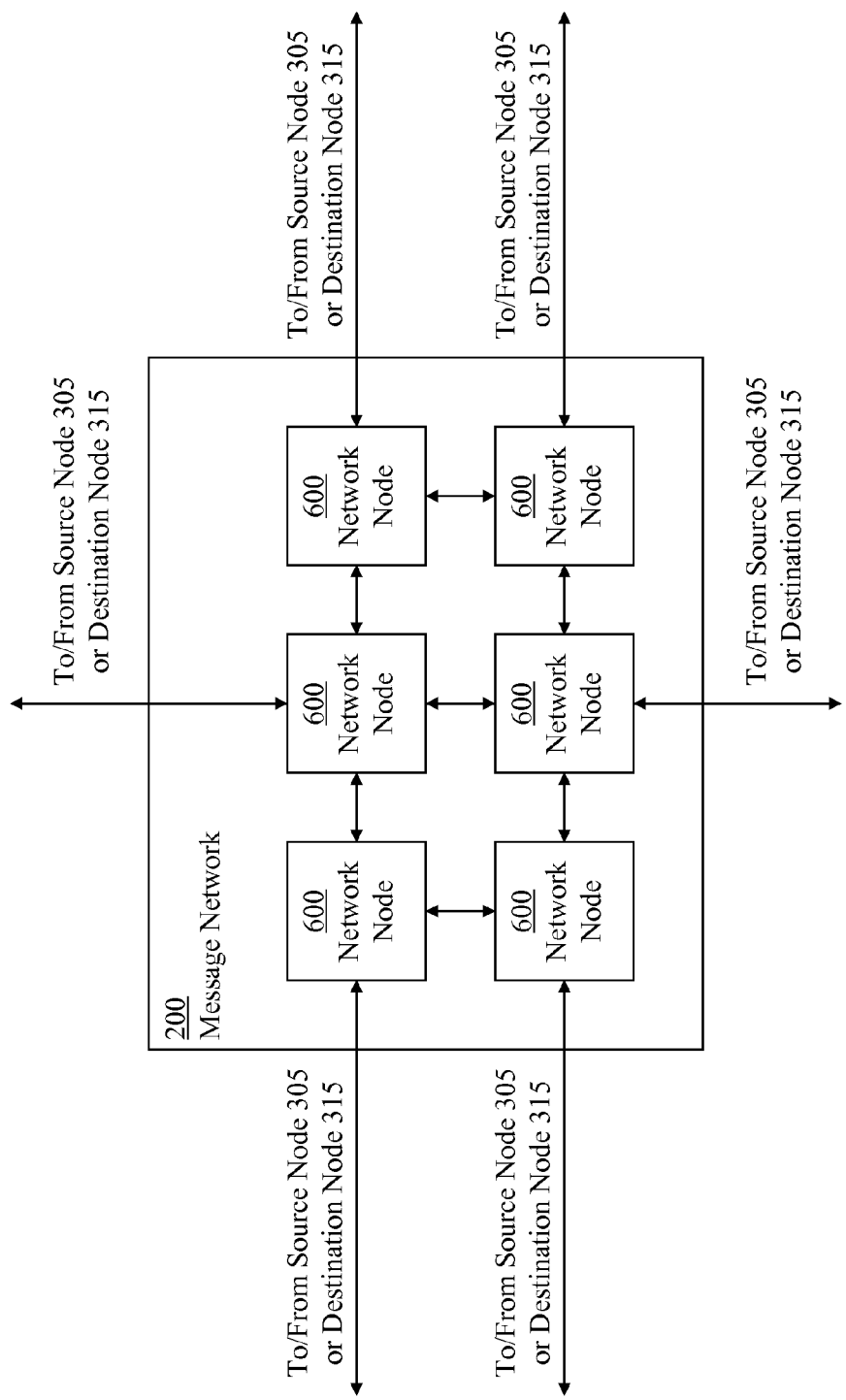
FIG. 6 is a block diagram of a message network, in accordance with an embodiment of the present invention.

FIG. 6 illustrates the message network 200, in accordance with an embodiment of the present invention. The message network 200 includes network nodes 600 interconnected in a two-dimensional grid defined by rows and columns. In various embodiments, each of the network nodes 600 in a column of the grid is coupled (e.g., connected) to at least one other network node 600 in that column. Moreover, each of the network nodes 600 in a row is coupled (e.g., connected) to at least one other network node 600 in that row. In this way, the message network 200 is a two-dimensional mesh network. Additionally, each of the network nodes 600 is coupled (e.g., connected) to a source node 305 or a destination node 315 of the communication system 300, or both.

In various embodiments, the message network 200 receives packets from a source node 305 in a sequential order and routes the packets (e.g., message data packets) to a destination node 315 in the same sequential order. In this way, the message network 200 routes packets from the source node 305 to the destination node 315 in order. In some embodiments, the message network 200 routes packets by using dimension-order routing. In these embodiments, the message network 200 routes packets along one dimension of the message network 200 and then routes the packets along another dimension of the message network 200. For example, the message network 200 may first route a packet received from a source node 305 horizontally along a row of the message network 200 and then route the packet vertically along a column of the message network 200 to a destination node 315.

In some embodiments, a column of the message network 200 may include a different number of network nodes 600 than another column of the message network 200. In some embodiments, a row of the message network 200 may include a different number of network nodes 600 than another row of the message network 200. In some embodiments, a column of the message network 200 or a row of the message network 200 may include a single network node 600.

FIG. 7 illustrates a message buffer pointer 700, in accordance with an embodiment of the present invention. The message buffer pointer 700 includes a source node identifier 705, a source queue identifier 710, and a message buffer address 715. The source node identifier 705 identifies a source node 305 in the communication system 300. The source queue identifier 710 identifies a message buffer pointer free queue 340 of the source node 305 identified by the source node identifier 705. The message buffer address 715 identifies a message buffer 355 of a message queue memory 350 of a destination node 315.

FIG. 8 illustrates a message data packet 800, in accordance with an embodiment of the present invention. The message data packet 800 includes a destination node identifier 805, a destination node address 810, and a data block 815. The destination node identifier 805 identifies a destination node 315 of the communication system 300. The destination node address 810 identifies a storage location 500 of a message buffer 355 in a message queue memory 350 of the destination node 315 identified by the destination node identifier 805. The data block 815 of the message data packet 800 includes a portion of a data message. In various embodiments, the data block 815 may included any number of data bits. For example, the data block 815 may include a data word or a double data word of the data message. In the present embodiment message data packet 800 does not include a message identifier (e.g., a transaction identifier) identifying the message.

FIG. 9 illustrates a message buffer pointer packet 900, in accordance with an embodiment of the present invention. The message buffer pointer packet 900 includes a destination node identifier 805, a destination node address 810 of a message buffer pointer input queue 345, and a message buffer pointer 700. In this way, the message buffer pointer packet 900 includes the source node identifier 705, the source queue identifier 710, and the message buffer address 715 of the message buffer pointer 700.

FIG. 10 illustrates a message buffer pointer response packet 1000, in accordance with an embodiment of the present invention. The message buffer pointer response packet 1000 includes a source node identifier 705, a source queue identifier 710, and a message buffer address 715. In various embodiments, a destination node 315 generates the message buffer pointer response packet 1000 based on a message buffer pointer packet 900 received by the destination node 315. Moreover, the message buffer pointer response packet 1000 includes the message buffer pointer 700 contained in the message buffer pointer packet 900.

Figure 11:
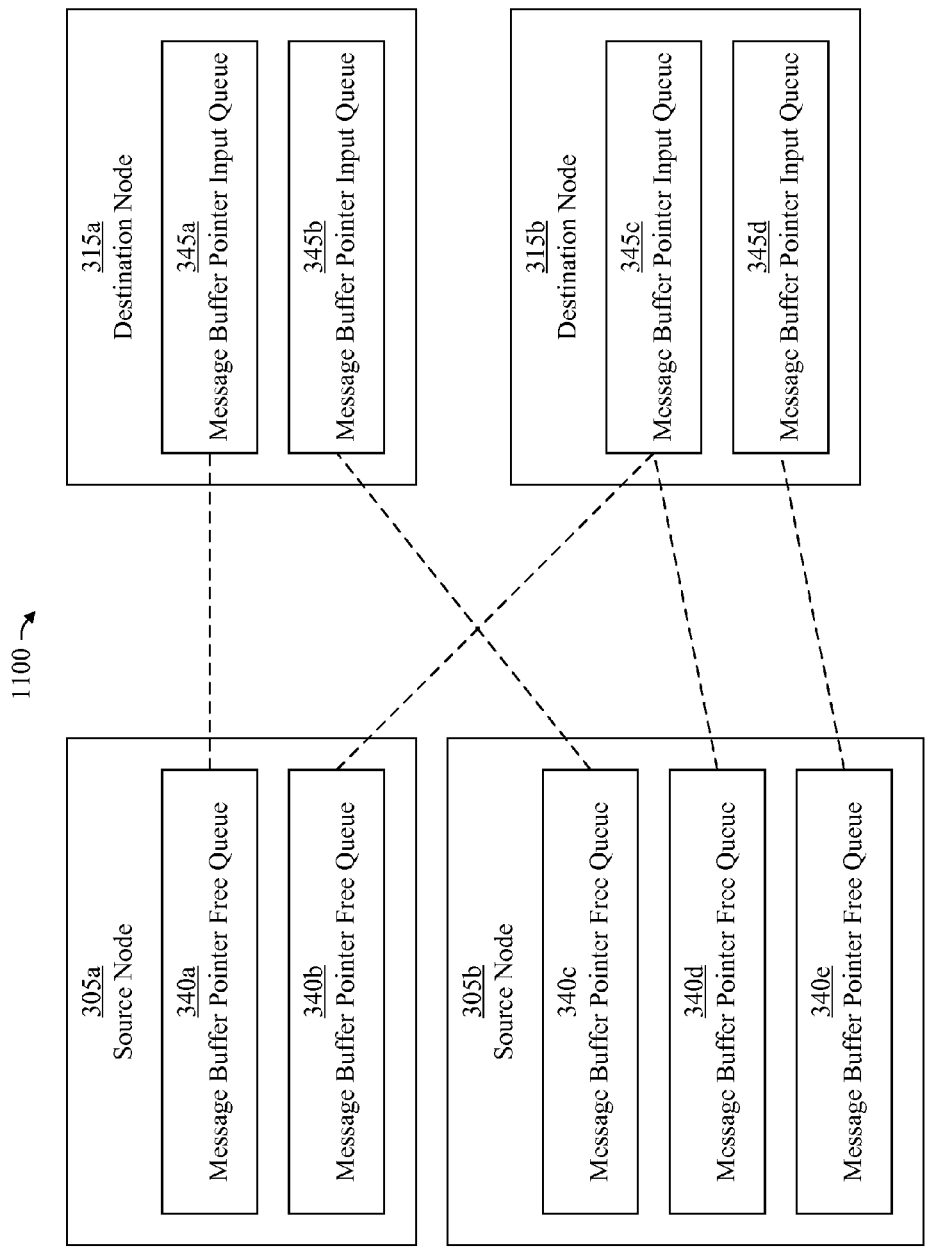
FIG. 11 is a block diagram of a message queue mapping, in accordance with an embodiment of the present invention.

FIG. 11 illustrates a message queue mapping 1100, in accordance with one embodiment of the present invention. The message queue mapping 1100 illustrates an exemplary association of message buffer pointer free queues 340 with message buffer pointer input queues 345 in the communication system 300. As illustrated in FIG. 11, the source node 305a includes a message buffer pointer free queue 340a and a message buffer pointer free queue 340b. The source node 305b includes a message buffer pointer free queue 340c, a message buffer pointer free queue 340d, and a message buffer pointer free queue 340e. The destination node 315a includes a message buffer pointer input queue 345a and a message buffer pointer input queue 345b. The destination node 315b includes a message buffer pointer input queue 345c and a message buffer pointer input queue 345d.

As illustrated in FIG. 11, the message buffer pointer free queue 340a of the source node 305a is associated with the message buffer pointer input queue 345a of the destination node 315a. The message buffer pointer free queue 340b of the source node 305a is associated with the message buffer pointer input queue 345c of the destination node 315b. In this way, the source node 305a includes two message buffer pointer free queues 340, each of which is associated with a message buffer pointer input queue 345 in a different destination node 315.

The message buffer pointer free queue 340c of the source node 305b is associated with the message buffer pointer input queue 345b of the destination node 315a. The message buffer pointer free queue 340d of the source node 305b is associated with the message buffer pointer input queue 345c of the destination node 315b. The message buffer pointer free queue 340e of the source node 305b is associated with the message buffer pointer input queue 345d of the destination node 315b.

Although both the message buffer pointer free queue 340b of the source node 305a and the message buffer pointer free queue 340d of the source node 305b are associated with the same message buffer pointer input queue 345c of the destination node 315b, the message buffer pointer free queue 340b of the source node 305a and the message buffer pointer free queue 340d of the source node 305b are associated with different message buffer pointers 700 identifying message buffers 355 in a message queue memory 350 of the destination node 315b. Moreover, the message buffer pointers 700 associated with the message buffer pointer free queue 340b of the source node 305a and the message buffer pointer free queue 340d of the source node 305b are unique because each of the message buffer pointers 700 identifies a different message buffer 355 in the message queue memory 350 of the destination node 315b.

Figure 12:
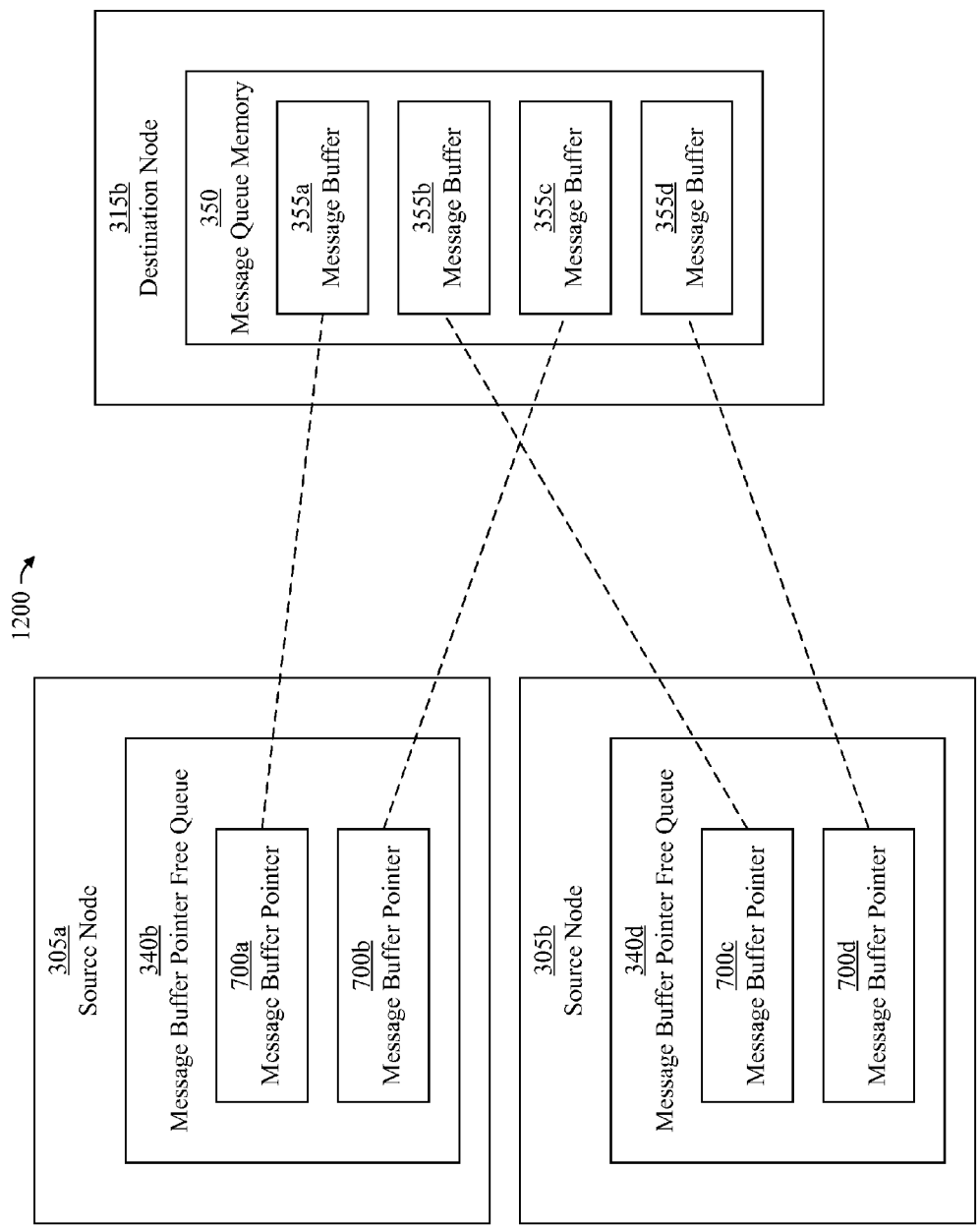
FIG. 12 is a block diagram of a message buffer mapping, in accordance with an embodiment of the present invention.

FIG. 12 illustrates a message buffer mapping 1200, in accordance with one embodiment of the present invention. The message buffer mapping 1200 illustrates an exemplary association of message buffer pointers 700 with message buffers 355 in the communication system 300. As illustrated in FIG. 12, the source node 305a includes the message buffer pointer free queue 340b of FIG. 11, and the source node 305b includes the message buffer pointer free queue 340d of FIG. 11. The message buffer pointer free queue 340b includes a message buffer pointer 700a and a message buffer pointer 700b. The message buffer pointer free queue 340d includes a message buffer pointer 700c and a message buffer pointer 700d. The destination node 315b includes a message queue memory 350 including message buffers 355a-d.

As illustrated in FIG. 12, the message buffer pointer 700a of the message buffer pointer free queue 340b identifies with the message buffer 355a in the message queue memory 350. The message buffer pointer 700b of the message buffer pointer free queue 340b identifies with the message buffer 355c in the message queue memory 350. The message buffer pointer 700c of the message buffer pointer free queue 340d identifies the message buffer 355b in the message queue memory 350. The message buffer pointer 700d of the message buffer pointer free queue 340d identifies with the message buffer 355d in the message queue memory 350. Because each of the message buffer pointers 700a-d identifies a different message buffer 355a-d of the message queue memory 350, the message buffer pointers 700a-d are unique message buffer pointers 700.

Figure 13:
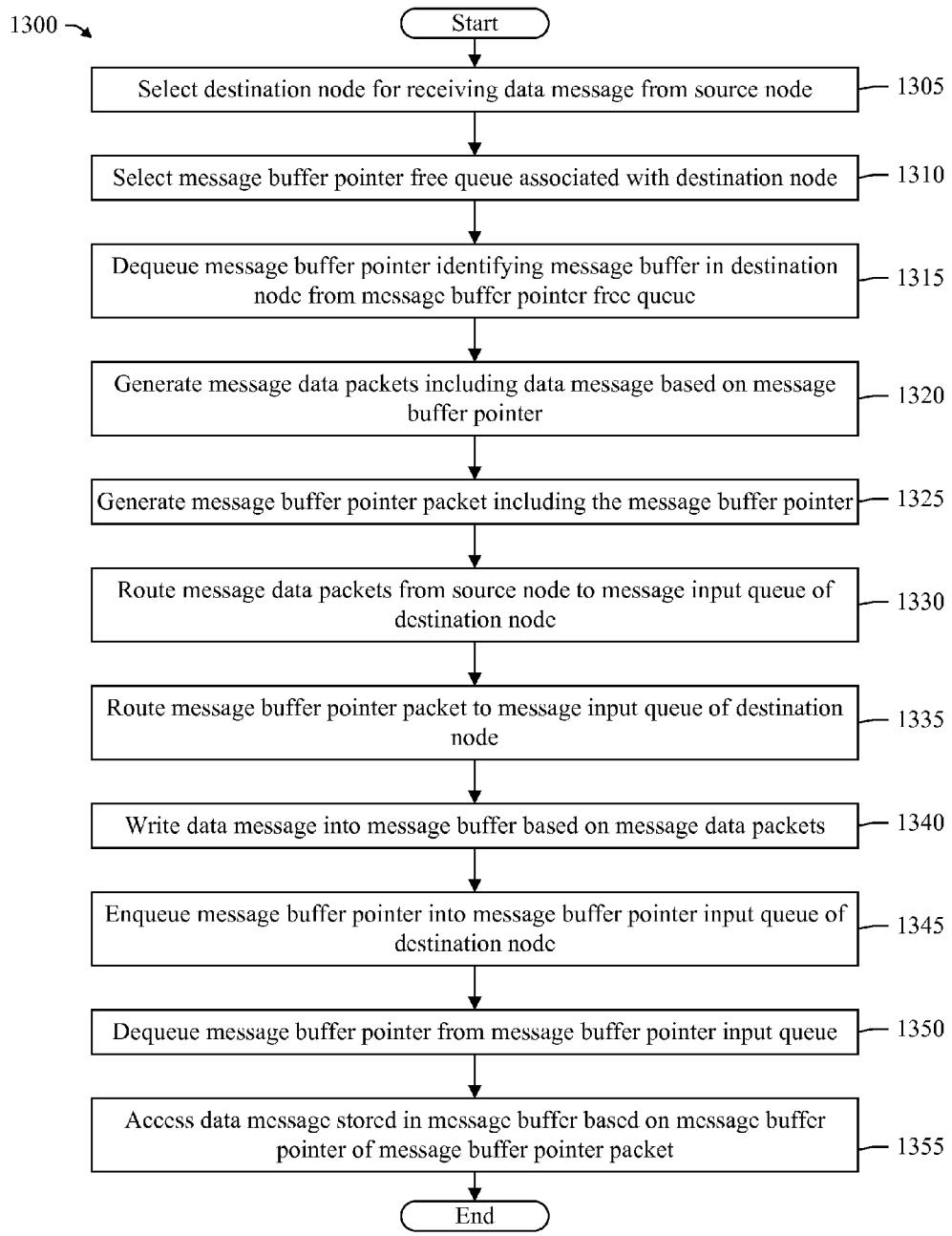
FIG. 13 is a flow chart of a method of routing a data message through a message network, in accordance with an embodiment of the present invention.

FIG. 13 illustrates a method 1300 for routing a data message through a message network. In step 1305, a destination node is selected for receiving a data message from a source node 305. In various embodiments, a source node 305 of the communication system 300 selects a destination node 315 of the communication system 300 for receiving a data message from the source node 305. For example, the packet engine 320 of the source node 305 may select the destination node 315. The method 1300 then proceeds to step 1310.

In step 1310, a message buffer pointer free queue associated with the destination node is selected. In various embodiments, the source node 305 selects a message buffer pointer free queue 340 of the source node 305 associated with the destination node 315. For example, the packet engine 320 of the source node 305 may select the message buffer pointer free queue 340 associated with the destination node 315. The method 1300 then proceeds to step 1315.

In step 1315, a message buffer pointer identifying a message buffer in the destination node is dequeued from the message buffer pointer free queue of the source node. In various embodiments, the source node 305 dequeues a message buffer pointer 700, which identifies a message buffer 355 in a message queue memory 350 of the destination node 315, from the selected message buffer pointer free queue 340 of the source node 305. For example, the packet engine 320 of the source node 305 may dequeue the message buffer pointer 700 from the selected message buffer pointer free queue 340. The method 1300 then proceeds to step 1320.

In step 1320, message data packets including the data message are generated based on the message buffer pointer. In various embodiments, the source node 305 generates message data packets 800 including the data message based on the message buffer pointer 700. For example, the packet engine 320 of the source node 305 may generate the message data packets 800. Each of the message data packets 800 includes a destination node identifier 805 identifying the destination node 315 and includes a data block 815, which is a portion of the data message. Additionally, each of the message data packets 800 includes a destination node address 810 of a storage location 500 in the message buffer 355 identified by the message buffer address 715 of the message buffer pointer 700. The method 1300 then proceeds to step 1325.

In step 1325, a message buffer pointer packet is generated including the message buffer pointer. In various embodiments, the source node 305 generates the message buffer pointer packet 900 including the message buffer pointer 700. For example, the packet engine 320 of the source node 305 may generate the message buffer pointer packet 900. The method 1300 then proceeds to step 1330.

In step 1330, the message data packets are routed from the source node to the destination node. In various embodiments, the message network 200 routes the message data packets 800 from the source node 305 to the destination node 315. In some embodiments, the message network 200 routes the message data packets 800 to the message input queue 330 of the destination node 315. In these embodiments, the message input queue 330 stores the message data packets 800. The method 1300 then proceeds to step 1335.

In step 1335, the message buffer pointer packet is routed from the source node to the destination node. In various embodiments, the message network 200 routes the message buffer pointer packet 900 from the source node 305 to the destination node 315. In some embodiments, the message network 200 routes the message buffer pointer packet 900 to the message input queue 330 of the destination node 315. In these embodiments, the message input queue 330 stores the message buffer pointer packet 900. The method 1300 then proceeds to step 1340.

In step 1340, the data message is written into the message buffer based on the message data packets. In various embodiments, the destination node 315 writes the data message into the message buffer 355 based on the message data packets 800. For example, the packet engine 335 of the destination node 315 may write the data message into the message buffer 355. In some embodiments, the packet engine 335 of the destination node 315 dequeues each of the message data packets 800 from the message input queue 330 and writes the data block 815 of the message data packet 800 into the storage location 500 of the message buffer 355 identified by the destination node address 810 of the message data packet 800. The method 1300 then proceeds to step 1345.

In step 1345, the message buffer pointer is enqueued in the message buffer pointer input queue of the destination node. In various embodiments, the destination node 315 enqueues the message buffer pointer 700 of the message buffer pointer packet 900 into the message buffer pointer input queue 345 identified by the destination node address 810 of the message buffer pointer packet 900. For example, the packet engine 335 of the destination node 315 may enqueue the message buffer pointer 700 of the message buffer pointer packet 900 into the message buffer pointer input queue 345.

In some embodiments, the packet engine 335 of the destination node 315 dequeues the message buffer pointer packet 900 from the message input queue 330 and enqueues the message buffer pointer 700 of the message buffer pointer packet 900 into the message buffer pointer input queue 345 identified by the destination node address 810 of the message buffer pointer packet 900. The method 1300 then proceeds to step 1350.

In step 1350, the message buffer pointer is dequeued from the message buffer pointer input queue. In various embodiments, the destination node 315 dequeues the message buffer pointer 700 from the message buffer pointer input queue 345. For example, the packet engine 335 of the destination node 315 may dequeue the message buffer pointer 700 from the message buffer pointer input queue 345. The method 1300 then proceeds to step 1355.

In step 1355, the data message stored in the message buffer is accessed based on the message buffer pointer of the message buffer pointer packet. In various embodiments, the destination node 315 accesses the data message in the message buffer 355 based on the message buffer pointer 700 of the message buffer pointer packet 900. For example, the packet engine 335 of the destination node 315 may access the data message in the message buffer 355 based on the message buffer address 715 in the message packet pointer 700 of the message buffer pointer packet 900. The method 1300 then ends.

In various embodiments, the method 1300 illustrated in FIG. 13 may include more or fewer than the steps 1305-1355 illustrated in FIG. 13 and described above. In some embodiments, the steps 1305-1355 of the method 1300 illustrated in FIG. 13 may be performed in a different order than the order illustrated in FIG. 13 and described above. In some embodiments, some of the steps 1305-1355 of the method 1300 illustrated in FIG. 13 may be performed in parallel or substantially simultaneously. In various embodiments, one or more of the steps 1305-1355 may be performed more than once in the method 1300 illustrated in FIG. 13.

Figure 14:
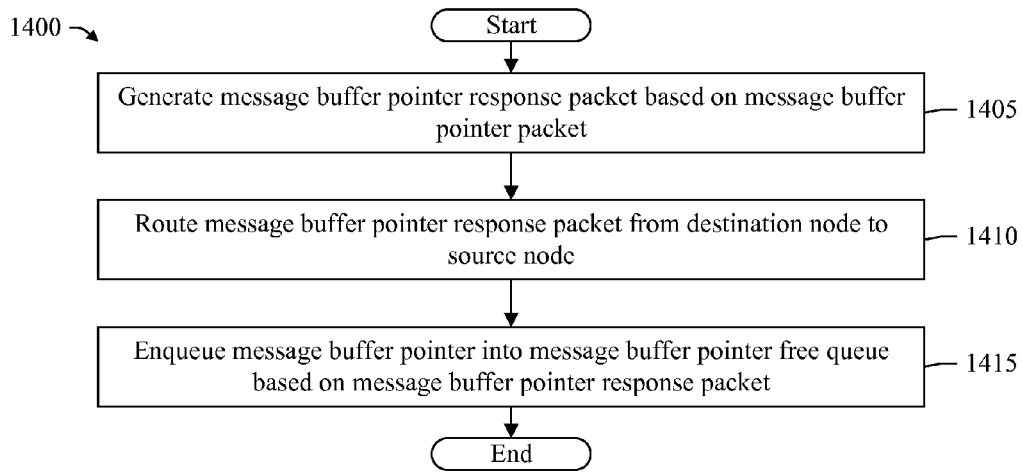
FIG. 14 is a flow chart of a portion of a method of routing a data message through a message network, in accordance with an embodiment of the present invention.

FIG. 14 illustrates a portion 1400 of the method 1300 of routing a data message through a message network, in accordance with an embodiment of the present invention. In various embodiments, the portion 1400 of the method 1300 follows step 1355 of the method 1300.

In step 1405, a message buffer pointer response packet is generated based on the message buffer pointer packet. In various embodiments, the destination node 315 generates a message buffer pointer response packet 1000 based on the message buffer pointer packet 900 received at the destination node 315. For example, the packet engine 335 of the destination node 315 may generate the message buffer pointer response packet 1000. The message buffer pointer response packet 1000 includes the source node identifier 705, the source queue identifier 710, and the message buffer address 715 in the message buffer pointer 700 of the message buffer pointer packet 900. In this way, the message buffer pointer response packet 1000 includes the message buffer pointer 700 of the message buffer pointer packet 900.

In another embodiment, the destination node 315 allocates a message buffer from a free pool of message buffers to the source node 305 and generates the message buffer pointer response packet 1000 in response to receiving the message buffer pointer packet 900. In this embodiment, the message buffer address 715 in the message buffer pointer response packet 1000 identifies the message buffer allocated from the free pool of message buffers. The portion 1400 of the method 1300 then proceeds to step 1410.

In step 1410, the message buffer pointer response packet is routed from the destination node to the source node. In various embodiments, the message network 200 routes the message buffer pointer response packet 1000 from the destination node 315 to the source node 305 based on the source node identifier 705 of the message buffer pointer 700 in the message buffer pointer response packet 1000. The portion 1400 of the method 1300 then proceeds to step 1415.

In step 1415, the message buffer pointer is enqueued in the message buffer pointer free queue based on the message buffer pointer response packet. In various embodiments, source node 305 enqueues the message buffer pointer 700 of the message buffer pointer response packet 1000 into a message buffer pointer free queue 340 based on the message buffer address 715 in the message buffer pointer response packet 1000. For example, the packet engine 320 of the source node 305 may enqueue the message buffer pointer 700 in the message buffer pointer free queue 340 by enqueueing the message buffer address 715 of the message buffer pointer 700 into the message buffer pointer free queue 340. This portion 1400 of the method 1300 then ends.

In various embodiments, the portion 1400 of the method 1300 illustrated in FIG. 14 may include more or fewer than the steps 1405-1415 illustrated in FIG. 14 and described above. In some embodiments, the steps 1405-1415 of the portion 1400 of the method 1300 illustrated in FIG. 14 may be performed in a different order than the order illustrated in FIG. 14 and described above. In some embodiments, some of the steps 1405-1415 of the portion 1400 of the method 1300 illustrated in FIG. 14 may be performed in parallel or substantially simultaneously. In various embodiments, one or more of the steps 1405-1415 may be performed more than once in the portion 1400 of the method 1300 illustrated in FIG. 14.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A system comprising:
   a destination node comprising a message buffer pointer input queue and further comprising a message queue memory including a plurality of message buffers;
   a source node comprising a message buffer pointer free queue, the message buffer pointer free queue comprising a destination node identifier register and a destination node address register, the source node configured to generate a message buffer pointer packet including a message buffer pointer identifying a message buffer of the plurality of message buffers, the message buffer comprising a plurality of storage locations, the source node further configured to generate a plurality of message data packets including a data message, each message data packet of the plurality of message data packets including a portion of the data message and an address of a storage location in the message buffer and configured to associate the message buffer pointer free queue with the message buffer pointer input queue by writing a destination node identifier of the destination node into the destination node identifier register and writing a destination node address of the message buffer pointer input queue into the destination node address register; and
   a message network coupled to the source node and the destination node, the message network configured to route the plurality of message data packets and the message buffer pointer packet to the destination node, the destination node configured to write a data message into the message buffer based on the plurality of message data packets and enqueue the message buffer pointer into the message buffer pointer input queue of the destination node to indicate the data message is stored in the message buffer identified by the message buffer pointer.

2. The system of claim 1, wherein the destination node is further configured to dequeue the message buffer pointer from the message buffer pointer input queue and access the data message stored in the message buffer based on the message buffer pointer of the message buffer pointer packet.

3. The system of claim 1, wherein the source node comprises a message buffer pointer free queue configured to store message buffer pointers, the source node further configured to dequeue the message buffer pointer from the message buffer pointer free queue, the destination node is further configured to generate a message buffer pointer response packet including the message buffer pointer based on the message buffer pointer packet, the message network is further configured to route the message buffer pointer response packet to the source node through message network, and the source node is further configured to enqueue the message buffer pointer into the message buffer pointer free queue based on the message buffer pointer response packet.

4. The system of claim 3, wherein the message buffer pointer includes a source node identifier identifying the source node, a source queue identifier identifying the message buffer pointer free queue, and a message buffer address identifying the message buffer in the message queue memory.

5. The system of claim 4, wherein the message buffer pointer free queue further comprises
   a message buffer address queue for storing the message buffer address of the message buffer pointer.

6. The system of claim 5, wherein the source node is further configured to enqueue the message buffer pointer into the message buffer pointer free queue by enqueueing the message buffer address of the message buffer into the message buffer address queue, and wherein the source node is further configured to dequeue the message buffer pointer from the message buffer pointer free queue by dequeueing the message buffer address from the message buffer address queue.

7. The system of claim 1, wherein the message network is configured to receive the message data packets from the source node and subsequently receive the message buffer pointer packet from the source node, the message network further configured to route the message data packets and the message buffer pointer packets from the source node to the destination node in a same order in which the message network receives the message data packets and the message buffer pointer packets from the source node.

8. A system comprising:
   a destination node comprising a message buffer pointer input queue and further comprising a message queue memory including a plurality of message buffers;
   a source node comprising a message buffer pointer free queue configured to store message buffer pointers, the message buffer pointer free queue comprising a destination node identifier register and destination node address register, the source node configured to dequeue a message buffer pointer identifying a message buffer of the message queue memory from the message buffer pointer free queue, generate a message buffer pointer packet including the message buffer pointer, and generate a sequence of message data packets having a sequential order and including a data message, each message data packet of the sequence of message data packets including a portion of the data message and an address of a storage location in the message buffer; and
   a message network coupled to the source node and the destination node, the message network configured to route the sequence of message data packets to the destination node in the sequential order and subsequently route the message buffer pointer packet to the destination node, the destination node configured to write the data message into the message buffer based on the sequence of message data packets, the destination node further configured to enqueue the message buffer pointer into the message buffer pointer input queue of the destination node to indicate the data message is stored in the message buffer of the message buffer pointer packet and configured to associate the message buffer pointer free queue with the message buffer pointer input queue by writing a destination node identifier of the destination node into the destination node identifier register and writing a destination node address of the message buffer pointer input queue into the destination node address register.

9. The system of claim 8, wherein the destination node is further configured to dequeue the message buffer pointer from the message buffer pointer input queue and access the data message stored in the message buffer based on the message buffer pointer.

10. The system of claim 8, wherein the destination node is further configured to generate a message buffer pointer response packet in response to receiving the message buffer pointer packet, the message network is further configured to route the message buffer pointer response to the source node through message network, and the source node is further configured to enqueue a message buffer pointer into the message buffer pointer free queue based on the message buffer pointer response packet.

11. The system of claim 8, wherein the message buffer pointer comprises a source node identifier identifying the source node, a source queue identifier identifying the message buffer pointer free queue, and a message buffer address identifying the message buffer.

12. The system of claim 11, wherein the message buffer pointer free queue further comprises
   a message buffer address queue for storing the message buffer address of the message buffer pointer.

13. The system of claim 12, wherein the source node is further configured to enqueue the message buffer pointer in the message buffer pointer free queue by enqueueing the message buffer address of the message buffer into the message buffer address queue, and wherein the source node is further configured to dequeue the message buffer pointer from the message buffer pointer free queue by dequeueing the message buffer address from the message buffer address queue.

14. A method comprising:
   generating a message buffer pointer packet by a source node, the message buffer pointer packet including a message buffer pointer identifying a message buffer of a message queue memory in a destination node;
   storing the message buffer pointer into a message buffer pointer free queue of the source node;
   associating the message buffer pointer free queue of the source node with a message buffer pointer input queue of the destination node by writing a destination node identifier into a destination node identifier register of the message buffer pointer free queue, the destination node identifier identifying the destination node and writing a destination node address into a destination node address register of the message buffer pointer free queue, the destination node address identifying the message buffer pointer input queue of the destination node;
   generating a plurality of message data packets including a data message, each message data packet of the plurality of message data packets including a portion of the data message and an address of a storage location in the message buffer;
   routing the plurality of message data packets from the source node to the destination node through a message network;
   writing the data message into the message buffer based on the plurality of message data packets;
   routing the message buffer pointer packet from the source node to the destination node through the message network after routing the plurality of message data packets to the destination node; and
   enqueueing the message buffer pointer into the message buffer pointer input queue of the destination node to indicate the data message is stored in the message buffer.

15. The method of claim 14, further comprising:
   dequeueing the message buffer pointer from the message buffer pointer input queue; and
   accessing the data message stored in the message buffer based on the message buffer pointer dequeued from the message buffer pointer input queue.

16. The method of claim 14, further comprising dequeueing the message buffer pointer from the message buffer pointer free queue of the source node.

17. The method of claim 16, further comprising:
   receiving the message buffer pointer packet at the destination node;
   generating a message buffer pointer response packet in response to receiving the message buffer pointer packet;
   routing the message buffer pointer response packet from the destination node to the source node through the message network; and enqueueing the message buffer pointer into the message buffer pointer free queue based on the message buffer pointer response packet.

18. The method of claim 14, wherein the message buffer pointer comprises a source node identifier identifying the source node, a source queue identifier identifying the message buffer pointer free queue, and a message buffer address identifying the message buffer.

19. The method of claim 18, further comprising:
selecting the destination node from a plurality of destination nodes coupled to the message network;
selecting the message buffer pointer input queue from a plurality of message buffer pointer input queues of the destination node;
and
enqueueing the message buffer address into a message buffer address queue of the message buffer pointer free queue.

\* \* \* \* \*